(12) United States Patent  
Fontanez et al.

(10) Patent No.: US 9,007,465 B1  
(45) Date of Patent: Apr. 14, 2015

(54) OBTAINING CUSTOMER SUPPORT FOR ELECTRONIC SYSTEM USING FIRST AND SECOND CAMERAS

(71) Applicant: VCE Company, LLC, Richardson, TX (US)

(72) Inventors: Jonathan Fontanez, Raleigh, NC (US); Todd Dolinsky, Chapel Hill, NC (US); Nicholas Hansen, Willow Spring, NC (US); Matthew Molner, Cary, NC (US)

(73) Assignee: VCE Company, LLC, Richardson, TX (US)

( * ) Notice: Subject to any disclaimer, the term of this patent is extended or adjusted under 35 U.S.C. 154(b) by 55 days.

(21) Appl. No.: 14/015,357

(22) Filed: Aug. 30, 2013

Related U.S. Application Data

(60) Provisional application No. 61/695,422, filed on Aug. 31, 2012.

(51) Int. Cl.
　　*H04N 5/30*　　　(2006.01)
　　*G06Q 30/00*　　(2012.01)
　　*H04N 7/14*　　　(2006.01)

(52) U.S. Cl.
　　CPC ............. *G06Q 30/016* (2013.01); *H04N 7/141* (2013.01)

(58) Field of Classification Search
　　USPC .............................................. 348/159, 207.1
　　See application file for complete search history.

(56) References Cited

U.S. PATENT DOCUMENTS

| | | | |
|---|---|---|---|
| 7,990,365 B2 * | 8/2011 | Marvit et al. | 345/156 |
| 8,164,617 B2 | 4/2012 | Mauchly | |
| 8,446,455 B2 | 5/2013 | Lian et al. | |
| 2010/0123770 A1 | 5/2010 | Friel et al. | |
| 2011/0050569 A1 * | 3/2011 | Marvit et al. | 345/158 |
| 2012/0262538 A1 | 10/2012 | Wu et al. | |
| 2012/0307048 A1 * | 12/2012 | Abrahamsson et al. | 348/142 |

* cited by examiner

*Primary Examiner* — Creighton Smith
(74) *Attorney, Agent, or Firm* — Womble Carlyle Sandridge & Rice, LLP

(57) ABSTRACT

A customer support technique for an electronic system includes engaging in a video chat with a remote customer support device using a first camera of a computerized apparatus while simultaneously acquiring images of the electronic system using a second camera and sending the images to the customer support device. A user of the computerized apparatus can thus engage in a face-to-face video chat with a customer support agent operating the customer support device while the customer support agent simultaneously sees both images of the user and images of the electronic system or portion thereof to which the user is pointing the second camera. The disclosed technique thus provides a near-hands-on support experience from a remote customer support agent regardless of the customer support agent's physical location.

20 Claims, 8 Drawing Sheets

OBTAINING CUSTOMER SUPPORT FOR ELECTRONIC SYSTEM USING FIRST AND SECOND CAMERAS

This application claims the benefit of U.S. Provisional Application No. 61/695,422, filed Aug. 31, 2012, the contents and teachings of which are hereby incorporated by reference in their entirety.

BACKGROUND

Customer support tools for electronic systems typically include chat applications. Chat applications allow users of electronic systems to exchange messages with customer support agents, usually within browser windows over the Internet. Some chat applications take advantage of the user's webcam, to allow the user and the customer support agent to communicate face-to-face using audio and video. Sometimes, during a chat application, a customer support agent asks a user to download diagnostic software to run on the user's machine. The customer support agent provides a link to the diagnostic software, and the user manually enters the link (e.g., in a new tab of the browser) to download the software. The user then runs the diagnostic software on the user's machine and reports back to the customer support agent any identified problems.

SUMMARY

An improved customer support technique for an electronic system includes engaging in a video chat with a remote customer support device using a first camera of a computerized apparatus while simultaneously acquiring images of the electronic system using a second camera and sending the images to the customer support device. A user of the computerized apparatus can thus engage in a face-to-face video chat with a customer support agent operating the customer support device while the customer support agent simultaneously sees both images of the user and images of the electronic system or portion thereof to which the user is pointing the second camera. The improved technique thus provides a near-hands-on support experience from a remote customer support agent regardless of the customer support agent's physical location.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of the various embodiments. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

Converged IT (Information Technology) Infrastructures, referred to herein by the acronym "CITIs," are sophisticated electronic systems that include a variety of components, such as computing resources, storage resources, and network resources, for example. CITIs may also include management tools, security tools, and virtualization platforms. Examples of commercially available CITIs are the Vblock™ family of systems from VCE Company, LLC, of Richardson, Tex. Vblock™ systems provide out-of-the-box IT infrastructures for cloud computing solutions.

The high levels of complexity and sophistication of CITIs can place high demands on customer support applications. When CITIs behave in an unexpected manner, conventional customer support applications often fall short in their ability to identify and resolve improper conditions. Conventional chat applications, even those providing face-to-face video, are often ill equipped to handle the diagnostic and remedial demands of CITIs and other complex electronic systems.

In contrast with prior applications, an improved customer support technique for an electronic system includes engaging in a video chat with a remote customer support device using a first camera (e.g., a front-facing camera) of a computerized apparatus while simultaneously acquiring images of the electronic system using a second camera (e.g., a rear-facing camera) and sending the images to the customer support device. The improved technique thus provides a near-hands-on support experience from the customer support agent regardless of the customer support agent's physical location.

Figure 1:
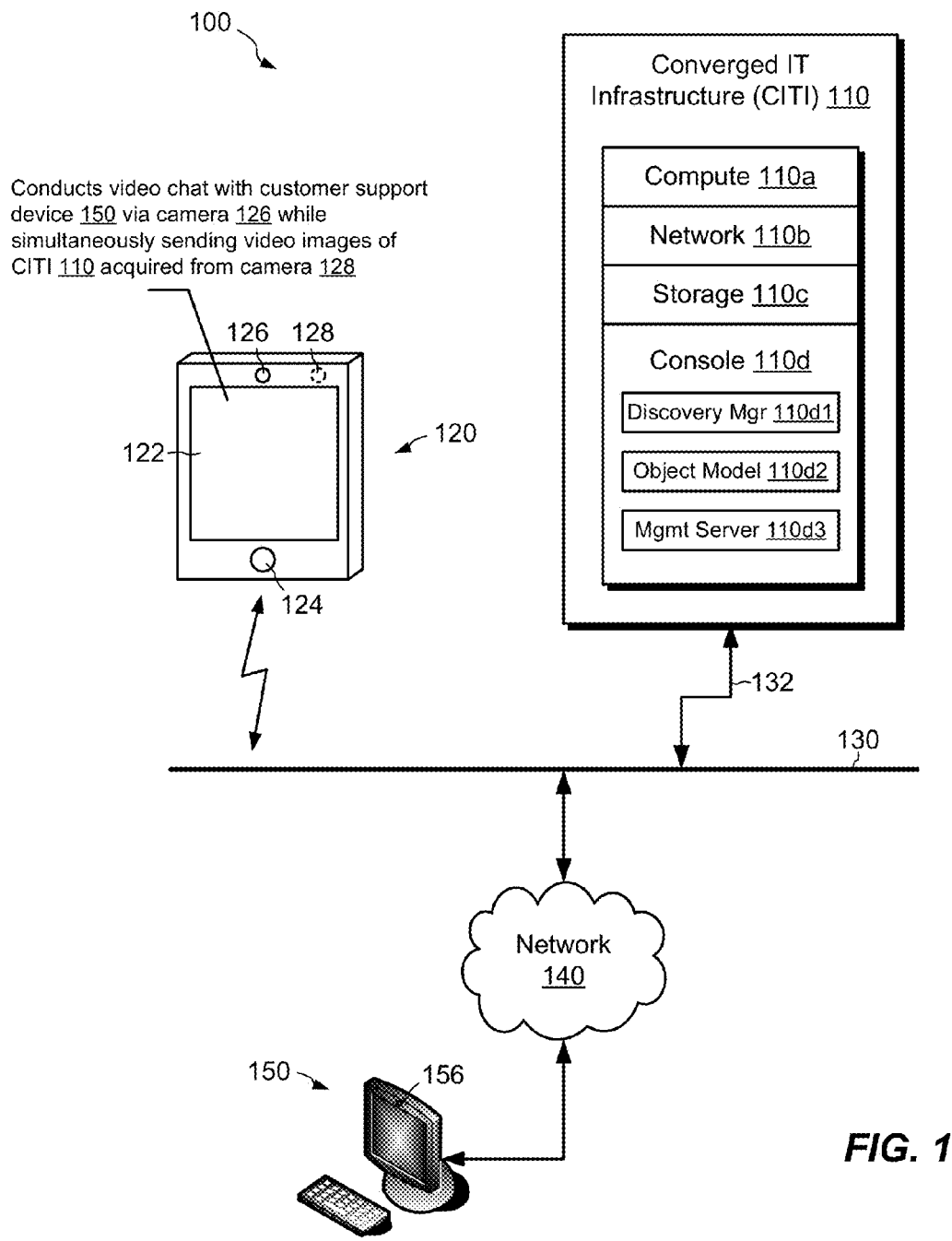
FIG. 1 is a block diagram of an example environment in which embodiments of the invention hereof can be practiced.

FIG. 1 shows an example environment 100 in which embodiments of the improved technique can be practiced. Here, an electronic system 110 and a computerized apparatus 120 each connect to a local area network (LAN) 130. For example, the electronic system 110 connects to the LAN 130 via an Ethernet cable 132 and the computerized apparatus 120 connects to the LAN 130 wirelessly, e.g., using a Wi-Fi (IEEE 802.11) networking standard. The LAN 130 itself connects to a network 140, such as a wide area network (WAN), the Internet, some other network, or some combination of networks. A router or some other networking device or devices (not shown) connects the LAN 130 to the network 140. A customer support device 150 also connects to the network 140, using any of the above described means, or some other means. The particular arrangement shown is merely illustrative.

In an example, the electronic system 110 is located in a data center or other site for housing computerized equipment, whereas the customer support device 150 is located remotely, e.g., in a different room, building, city, state, country, etc. Any such data center or other site may house any number of electronic systems.

In the example shown, the computerized apparatus 120 has a touch screen 122, a button 124, a front-facing camera 126, and a rear-facing camera 128. As is known, the touch screen 122 serves as both an input device and a display. The front-facing camera 126 and the touchscreen face to the front (e.g., toward a user of the computerized apparatus 120 in normal operation), whereas the rear-facing camera 128 faces to the back (e.g., away from the user). In an example, the computerized apparatus 120 is a portable computing device, such as a tablet computer (e.g., an iPad, Windows tablet, Android tablet, etc.), smart phone, PDA (personal data assistant), and so forth, with integrated cameras 126 and 128, which a user can carry by hand for working with and around the electronic system 110 while conducting a video chat with a customer support agent operating the customer support device 150. The computerized apparatus 120 may be provided, however, in any suitable form, provided it has cameras 126 and 128 and is capable of running programs, connecting to a computer network (such as the LAN 130), and conducting a video chat. In some examples, the computerized apparatus 120 is provided in the form of multiple components, which include a stationary component, such as a workstation, desktop computer, or laptop computer, and a mobile component, which houses the cameras 126 and 128 and is capable of being carried around the electronic system 110 by a user.

The customer support device 150 has a camera 156, for conducting a video chat with the user of the computerized apparatus 120. The customer support device 150 may be implemented in any suitable way, limited only in that it must be capable of running programs, connecting to a network, and conducting a video chat. Although the word "device" is used to describe the customer support device 150, it is understood that the customer support device 150 may include any number of components connected together and that the customer support device 150 is therefore not limited to being a single manufactured item. With the generality of the customer support device 150 kept in mind, it should be understood that the customer support device 150 may itself be implemented as a mobile device, such as a tablet computer, and may in fact be provided in a configuration similar to that of the computerized apparatus 120. In an example, the customer support device 150 provides customer support to any number of customers for supporting any number of electronic systems like the system 110.

In some arrangements, the computerized apparatus 120 is operated by a customer who owns or operates the electronic system 110. In other arrangements, the computerized apparatus 120 is operated by field service personnel visiting a customer site, or by some other user.

In an example, the electronic system 110 is provided in the form of a converged IT infrastructure (CITI), which may be used, for example, for hosting cloud-based computing solutions. The CITI may include compute resources 110a (e.g., server blades), network resources 110b (e.g., network blade switches), storage resources 110c (e.g., data storage arrays), and a console 110d. The various resources 110a through 110d are typically installed in one or more chassis housed in one or more racks, which provide space, power, cooling, interconnections, data communications, and environmental monitoring for the CITI.

The console 110d includes one or more computers that provide tools for managing and controlling the CITI. The tools include, for example, a discovery manager 110d1, an object model 110d2, and a management server 110d3. The discovery manager 110d1 performs discovery operations to obtain a configuration of the CITI, including its installed components, firmware versions, software versions, model numbers, serial numbers, performance metrics, and relationships to one another, for example. The object model 110d2 stores a persistent logical representation of the discovered components and characteristics of the CITI, and thus serves as a central repository for information about the CITI. The management server 110d3 acts as an interface between the CITI and its environment. In an example, the management server 110d3 includes interfaces for querying the object model 110d2 and providing CITI-specific information to clients accessing the CITI over a network, e.g., over the LAN 130. In a particular example, the management server 110d3 includes a version of vCenter from VMware®, which has been modified with a plug-in that supports the display and management of CITIs (e.g., Vblock™ systems).

In example operation, a user of the computerized apparatus 120 launches a program (application, app, service, widget, etc.) on the computerized apparatus 120 to operate a management client installed on the computerized apparatus 120. The management client running on the computerized apparatus 120 accesses, over the LAN 130, the management server 110d2 on the CITI (as well as management servers 110d2 of other CITIs, if there are any) to display CITI-specific information on the touch screen 122. The user selects a CITI from the touch screen 122 and operates the client's user interface to launch a chat session for the selected CITI. A chat program runs on the computerized apparatus 120 and establishes a connection with the customer support device 150 over the LAN 130 and the network 140. The chat program may be part of the management client or separate. With the connection established, the user may conduct a face-to-face video chat with the customer support agent using the front-facing camera 126, while simultaneously transmitting video images of the electronic system 110 acquired using the rear-facing camera 128.

The chat program includes both a video channel and a data channel. The video channel carries full duplex video and audio information for conducting the chat session and simultaneously transmits images from the rear-facing camera 128, whereas the data channel supports an exchange of diagnostic and/or remedial information, and in some cases additional information, between the computerized apparatus 120 and the customer support device 150. In an example, the video channel and the data channel are logical channels, rather than physically distinct channels, with information for both channels being transferred over a common connection to the LAN 130 and/or network 140.

While a video chat takes place, the user may operate the management client and/or the chat program on the computerized apparatus 120 to perform various functions. For example, the user operates a control of the chat program to gather diagnostic information from the selected CITI. In response, the chat program sends a message to the management server 110d3 of the selected CITI directing the management server 110d3 to perform diagnostic tests on the CITI, gather the results, and return the information to the chat program running on the computerized apparatus 120. Once the chat program receives the diagnostic information, the chat program sends the diagnostic information, over the data channel, to the customer support device 150 to be viewed by the customer support agent, all while the video chat continues uninterrupted.

The customer support agent may then view the diagnostic information about the selected CITI and provide remedial information. The remedial information may take a variety of forms, such as links to firmware revisions, links to software revisions, the revision files themselves, other files, programs, or other data or metadata. The remedial information may also take the form of documentation describing the proper order in which to apply remedial software and/or firmware revisions, as well as descriptions of any manual or automated steps needed to successfully remediate the CITI. The customer support agent sends the remedial information back to the computerized apparatus 120, which receives the remedial information over the data channel while the video chat over the video channel continues uninterrupted.

In an example, the remedial information includes a link to a firmware or software revision and the chat program presents the link to the user on its user interface displayed on the touchscreen 122. The user has the option to tap (click, or otherwise select) the link to download the revision. In one example, tapping the link causes the revision to be downloaded to the computerized apparatus 120. In another example, tapping the link causes the revision to be downloaded directly to the CITI. The chat program then presents a control on its user interface that allows the user to install the downloaded revision on the CITI. When the user operates the control, the chat program directs the CITI to install the revision (or copies the revision to the CITI and then directs the CITI to install the revision).

The above-described process of gathering diagnostic information from the CITI, transmitting the gathered diagnostic information to the customer support device 150 over the data channel, and receiving remedial information over the data channel, all while the video chat continues uninterrupted, may be repeated as many times as necessary until all improper conditions with the CITI have been resolved. The combination of video chat, images of the CITI from the rear-facing camera 128, and data communication provides the customer support agent with a near-hands-on support experience, and allows the user and the customer support agent to work together effectively to restore the CITI to proper operating condition.

Although the example above provides that the user initiates the chat session with the customer support agent, the customer support agent may alternatively initiate the chat session with the user. In an example, the customer support device 150 runs a chat program that is similar to the chat program that runs on the computerized apparatus 120. The chat program on the customer support device 150 may provide separate video and data channels, to enable the exchange of data within the chat application while the video chat proceeds without interruption. The customer support agent may thus start the chat program on the customer support device 150 and initiate a chat session with the user of the computerized apparatus 120.

Figure 2:
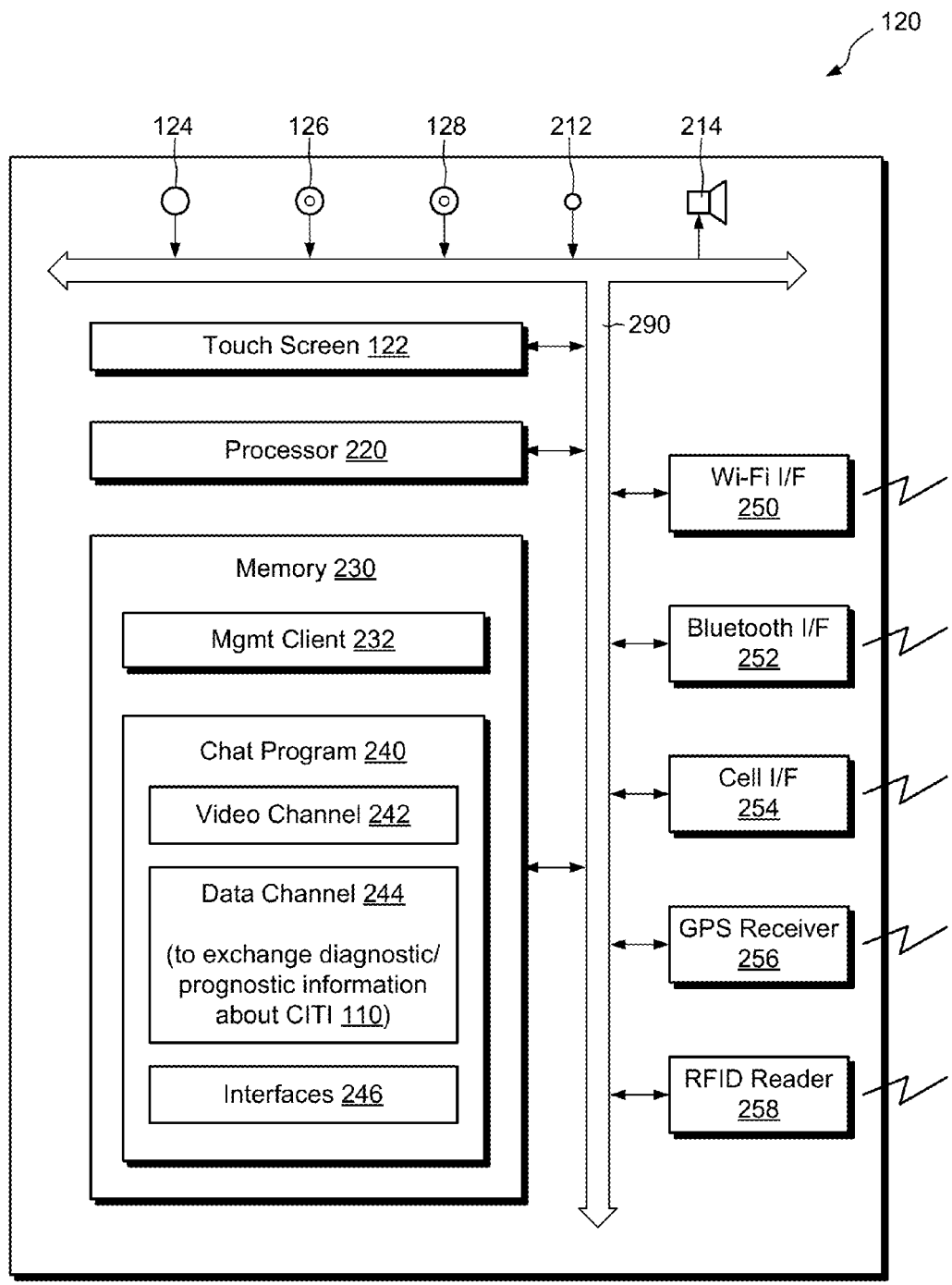
FIG. 2 is a block diagram of an example computerized apparatus as shown in FIG. 1, which can be used for conducting a video chat with a remote customer support agent.

FIG. 2 shows an example computerized apparatus 120 in greater detail. In addition to the touch screen 122, button 124, front-facing camera 126, and rear-facing camera 128 already described, the computerized apparatus 120 also includes a microphone 212 and a speaker 214. The microphone 212 and speaker 214 respectively send and receive audio signals that accompany the video chat.

The computerized apparatus 120 is further seen to include a processor 220 (i.e., one or more processing chips and/or assemblies) and memory 230. The memory 230 includes both volatile memory (e.g., RAM) and non-volatile memory, such as one or more disk drives, solid state drives (SSDs) and the like. The processor 220 and the memory 230 together form control circuitry, which is constructed and arranged to carry out various methods and functions as described herein. Also, the memory 230 includes a variety of software constructs realized in the form of executable instructions. When the executable instructions are run by the processor 220, the processor 220 is caused to carry out the operations of the software constructs.

The computerized apparatus 120 is further seen to include various wireless interfaces, such as a Wi-Fi interface 250, a Bluetooth interface 252, a cellular telephone interface 254, a GPS (Global Positioning Satellite) receiver 256, and an RFID (Radio Frequency Identification) reader 258. Each of these interfaces find application in various embodiments hereof but are optional in others.

A bus 290 interconnects the various components of the computerized apparatus 120 and provides a vehicle for communicating among such elements. In various examples, the bus 290 is implemented as a system bus or as multiple distinct busses, each serving a respective sub-system of the computerized apparatus 120 and having interconnections to the others. It is understood that certain elements are omitted from FIG. 2 for simplicity, such as circuitry for interfacing analog components 124, 126, 128, 212, and 214 to the bus 290, and that those skilled in the art could readily reproduce such missing elements.

The memory 230 includes various software constructs, such as the above-described management client (232) and chat program (240). The chat program 240 provides the above-described video channel (242), for conveying full-duplex video during customer support chat sessions while simultaneously sending images acquired from the rear-facing camera 128, and the above-described data channel (244), for exchanging diagnostic, remedial, and/or other information pertaining to a CITI or other electronic system 110. The chat program 240 may operate the video channel 242 and the data channel 244 simultaneously, to exchange data over the data channel 244 while a video chat proceeds without interruption over the video channel 242. The chat program 240 further includes interfaces 246, for sending and/or receiving data from the various wireless interfaces 250, 252, 254, 256, and 258. In some examples, the video channel 242 and data channel 244 are implemented as interfaces within an application layer of the chat program 240. Although certain software constructs are specifically shown and described, it is understood that the memory 230 typically includes many other software constructs, which are not shown, such as an operating system and various applications, processes, services, and the like.

Figure 3A:
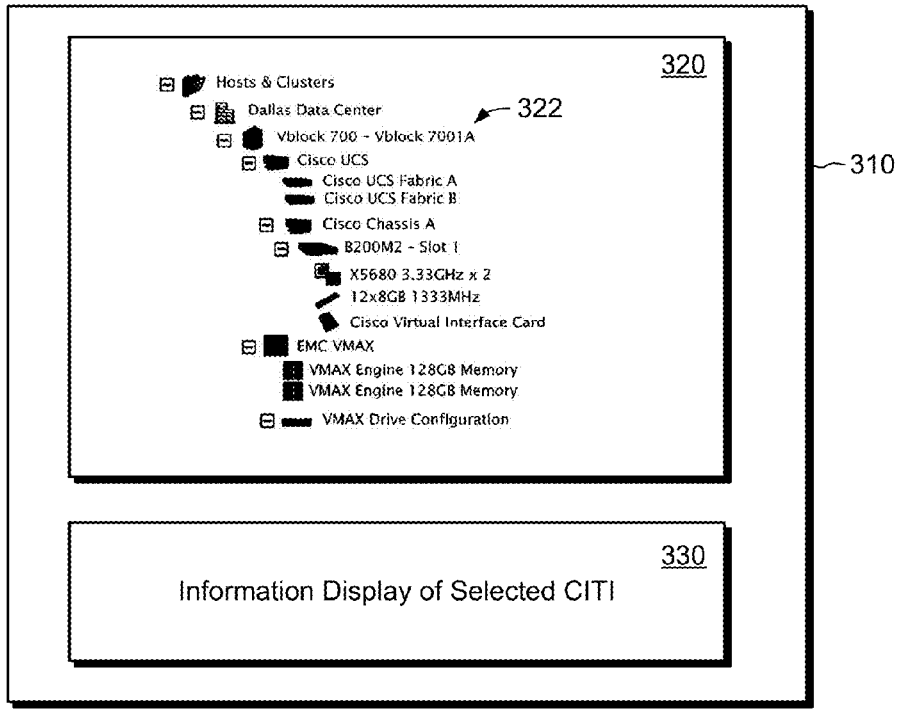
FIGS. 3A and 3B are screen shots showing an example tree-based representation of an electronic system as shown in FIG. 1.
Figure 3B:
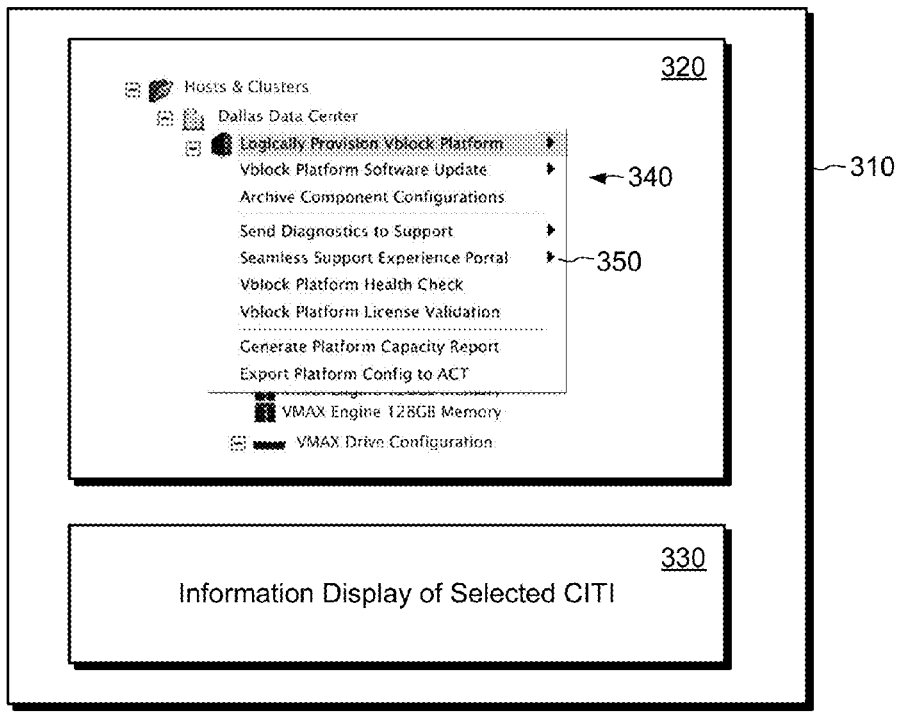

FIGS. 3A and 3B show example screen shots of the management client 232 as displayed on the touch screen 122 of the computerized apparatus 120. As shown in FIG. 3A, an example screen shot 310 includes a first pane 320 and a second pane 330. The first pane 320 displays a tree-based representation of various CITIs, whereas the second pane 330 displays detailed information about CITIs or components thereof selected in the first pane 320. In an example, users must authenticate to run the management client 232, and each authenticated user is allowed to view particular CITIs. The illustrated screen shot 310 shows CITIs housed in the "Dallas Data Center," which include a CITI with an identifier 322, which reads, "Vblock 700-Vblock 7001A." The tree-based representation lists various components of this CITI as subordinate elements. The user may select (e.g., tap or click) any of the displayed components in the first pane 320 to list detailed information about the selected component in the second pane 330. In an example, selecting a component displayed in the first pane 320 causes the management client 232 to send a query to the management server 110*d*3 of the electronic system 110 (e.g., the "Vblock 700-Vblock 7001A" CITI). In response to the query, the management server 110*d*3 queries the object model 110*d*2 to obtain the requested information and returns the requested information to the management client 232, which displays the information in the second pane 330.

FIG. 3B shows a result of the user selecting the identifier 322, e.g., by long-tapping or right-clicking, etc., to display a context-sensitive menu 340, which provides the user with various options for performing actions in relation to the selected CITI. Among the available options is option 350, i.e., to enter a "Seamless Support Experience Portal." In an example, selecting the option 350 causes the management client 232 to launch the chat program 240.

In the illustrated example, the chat program 240 may be invoked both from within the management client 232 and independently of the management client 232, e.g., as an "app" that users can run by selecting an icon on a home screen of the computerized apparatus 120. Alternatively, the chat program 240 runs as part of the management client 232 (e.g., as a plug-in or add-on). In further examples, the arrangement is reversed and the management client 232 runs as a plug-in or add-on of the chat program 240. In addition, it should be understood that the management client 232 as shown in FIGS. 3A and 3B is merely an example. Other management clients may be used, having characteristics that differ from those shown in FIGS. 3A and 3B. For example, not all implementations of the management client 232 must present CITIs in the form of tree-based representations.

Figure 4A:
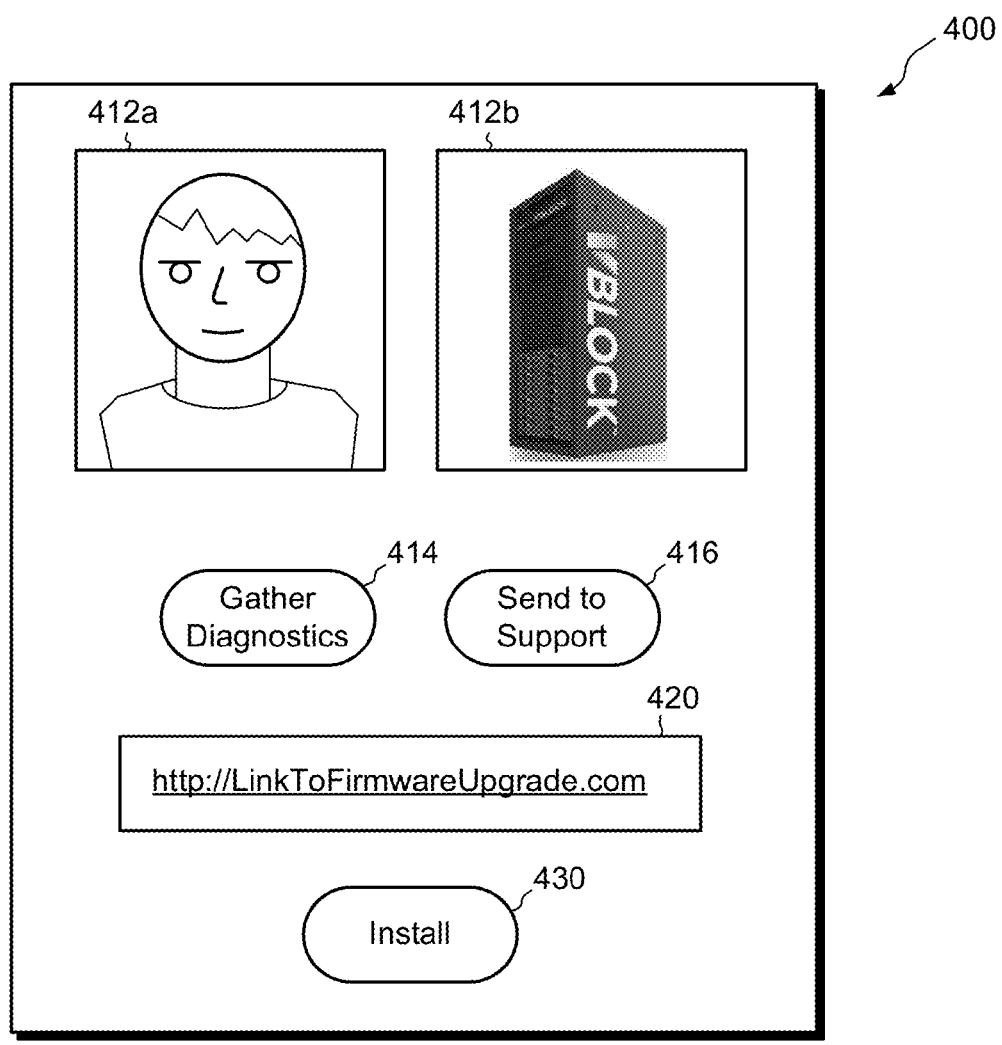
FIGS. 4A and 4B are screen shots showing example displays of a video chat program operated on the computerized apparatus of FIG. 2, as seen on the computerized apparatus (FIG. 4A) and as seen on the customer support device (FIG. 4B)

FIG. 4A shows an example screen shot 400 produced by the chat program 240 and displayed on the touch screen 122 of the computerized apparatus 120. In the illustrated view, a video chat session is shown in progress with a live video image of the customer support agent displayed in a window 412*a*. Optionally, the screen shot 400 also includes a window 412*b*, which displays to the user images acquired from the rear-facing camera 128 of the computerized apparatus 120, thereby enabling the user to see the images of the CITI being sent to the customer support device 150 during the video chat. The user and the agent can thus converse face-to-face over the video channel 242, with images acquired from the rear-facing camera 128 transmitted to the customer support device 150 over the video channel 242, while at the same time exchanging information (e.g., metadata and data pertaining to the selected CITI) over the data channel 244. In an example, the user initiates the chat because the user has discovered some improper condition on the selected CITI. Improper conditions may include, for example and without limitation, error messages, warnings, or other indications that attention is required, such as on account of a software and/or firmware of a component of the CITI being out of date or inconsistent with other software and/or firmware versions.

As shown, the user may perform a number of actions during the course of the video chat. For example, by tapping (or otherwise selecting) a "Gather Diagnostics" button 414, the chat program 240 communicates with the selected CITI to gather diagnostic information (in the manner described above). By tapping (or otherwise selecting) a "Send to Support" button 416, the chat application 240 transmits the gathered diagnostic information to the customer support device 150 over the data channel 244, while the video chat and transmission of images from the rear-facing camera 128 proceeds over the video channel 242 without interruption. Other types of controls may be used in place of the buttons 414 and 416, and other controls may be provided for performing other functions. Those shown are merely illustrative.

The customer support agent receives and views the diagnostic information. The customer support agent may then identify one or more remedial measures and send remedial information addressing any improper condition(s) revealed in the diagnostic information back to the computerized apparatus 120, which receives the remedial information over the data channel 244. In the example shown, the diagnostic information indicates an improper firmware revision of a component of the CITI and the remedial information includes a link 420 to the proper firmware version (e.g., an upgrade to a newer version or a roll-back to an earlier version). If the user wishes to do so, the user may tap (or otherwise select) the link 420 to download the proper firmware. As already described, the user performing this action may cause the firmware to be downloaded to the computerized apparatus 120 or directly to the selected CITI. When the user then taps (or otherwise selects) the "Install" button 430, the chat application directs the CITI to install the downloaded firmware. The above-described actions of gathering diagnostics, sending the diagnostics to support, receiving a link for a proper version, and installing the proper version can be repeated as many times as necessary to resolve all improper conditions. These actions can take place while the video chat proceeds without interruption, thereby promoting a near-hands-on support experience.

Figure 4B:
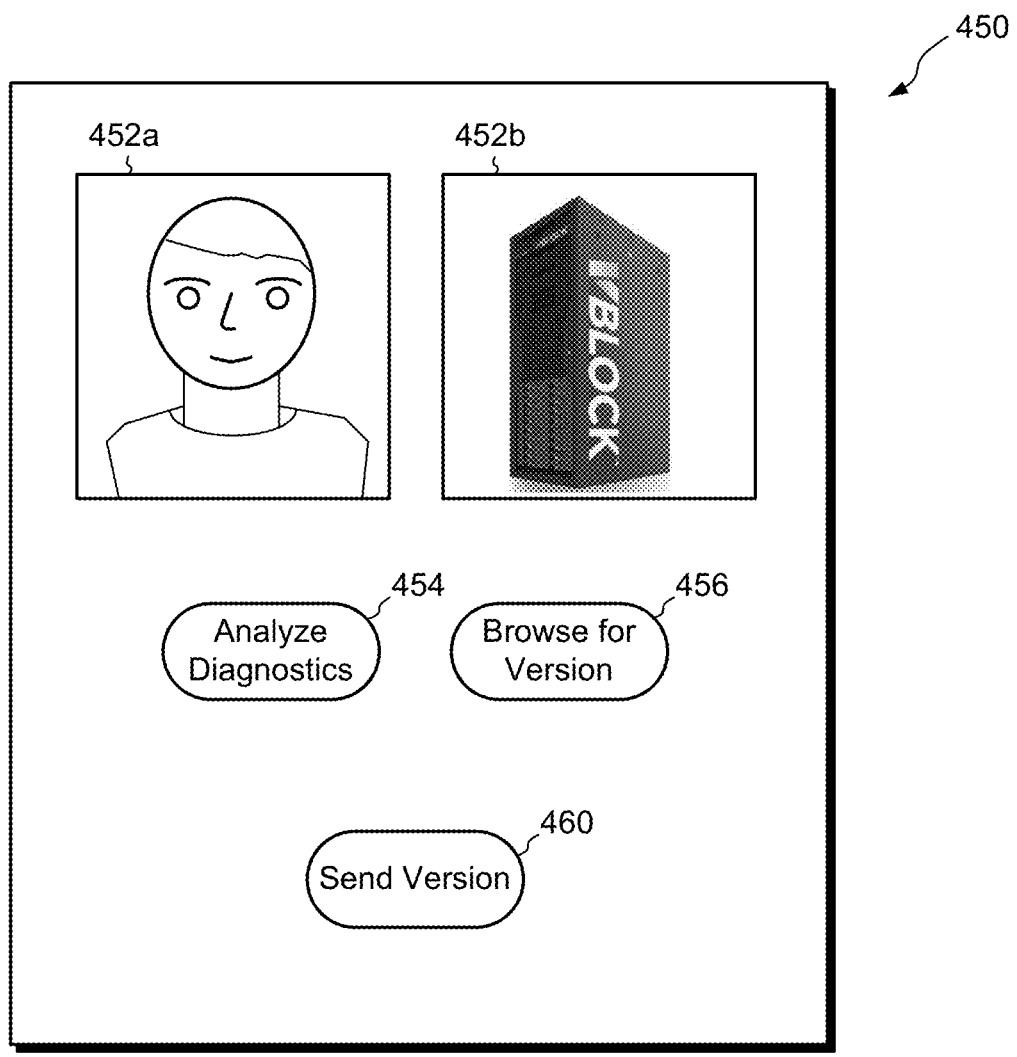

FIG. 4B shows an example screen shot 450 produced by a chat program running on the customer support device 150. In the illustrated view, a video chat session is shown in progress with a live video image of the user displayed in a window 452*a*. The screen shot 450 also includes a window 452*b*, which displays to the customer support agent the images acquired from the rear-facing camera 128 of the computerized apparatus 150, thereby enabling the customer support agent to see the images of the CITI received from the computerized apparatus 120 during the video chat.

In an example, the chat program on the customer support device 150 is similar to the chat program 240 on the computerized apparatus 120 and includes both a video channel and a data channel. The video channel of the customer support device 150 sends and receives video for the video chat, including receiving video acquired from the rear-facing camera 128 of the computerized apparatus 120, while the data channel of the customer support device 150 sends and receives data and/or metadata.

The screen shot 450 may display various controls. These include, for example, an "Analyze Diagnostics" button 454, to perform a computer analysis of diagnostic information received from the computerized apparatus 120 over the data channel of the customer support device 150, a "Browse for Version" button 456, for allowing the customer support agent to select firmware and/or software versions for remediating improper conditions of the computerized apparatus 120 revealed by the diagnostic information, and a "Send Version" button 460, for sending selected firmware and/or software versions (or links to such versions) to the computerized apparatus 120 over the data channel of the customer support device 150.

The chat program 240 may include various features to enhance usability. For example, the user may select the window 412*b* (such as by tapping) to enlarge the window and allow easier viewing of the images acquired from the rear-facing camera 128. The user may further enlarge the image (e.g., by pinching) to zoom in on particular features. The customer support agent may perform similar actions on the customer support device 150, to enlarge the window 452b and zoom in on the images presented.

As the screen shots 400 and 450 suggest, the user and the customer support agent can work closely together to assess the condition of the CITI (or other electronic system 110) and/or components thereof, and the customer support agent can take visual information acquired from the rear-facing camera 128 into account when diagnosing improper conditions and suggesting remedial actions.

In some examples, the CITI includes various visual indicators and the rear-facing camera 128 acquires images of the indicators to further assist the customer support agent in assessing the condition of the CITI. For instance, the CITI may include visually readable temperature monitors, which display, for example, the environmental temperature around the CITI, temperatures within particular chassis of the CITI, and/or temperatures of particular components of the CITI. By pointing the rear-facing camera 128 at the temperature monitors, the customer support agent is able to see immediately the measured temperatures and identify any unexpected conditions. Similar acts may be performed for other environmental monitors, such as hygrometers and barometers, for example.

Also, components of the CITI may include visual status indicators and/or activity monitors in the form of lights, which may illuminate in various colors and in various patterns. Sequences of illumination of such lights may be difficult for the user to describe to the customer support agent, but it is a fairly simple matter for the user to point the rear-facing camera 128 at the lights to allow the customer support agent to see the patterns of illumination for himself or herself and decipher their meaning.

Figure 5:
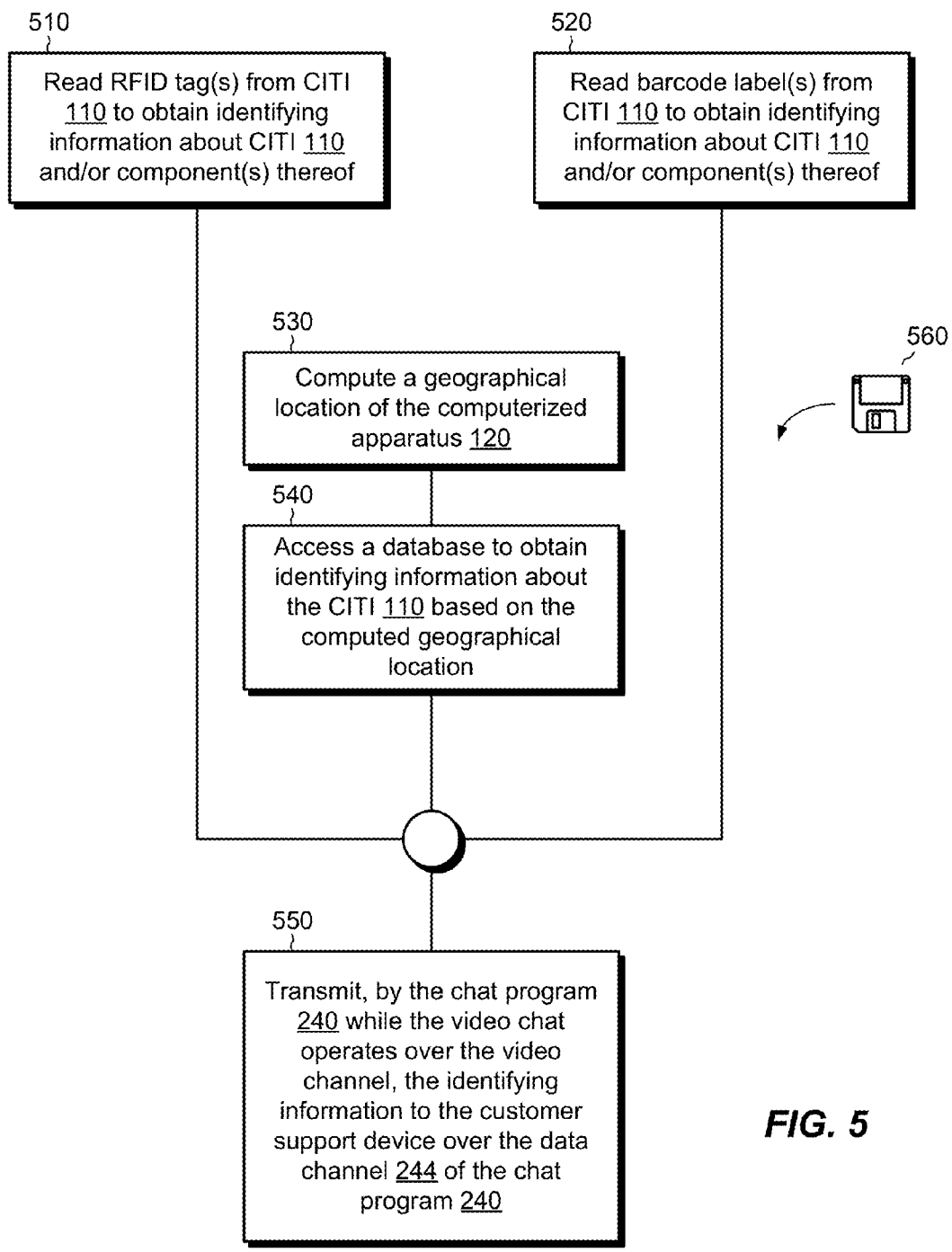
FIG. 5 is a flow chart showing various example processes for identifying a particular electronic system for which customer support is sought, and/or for identifying particular components of the electronic system.
Figure 6:
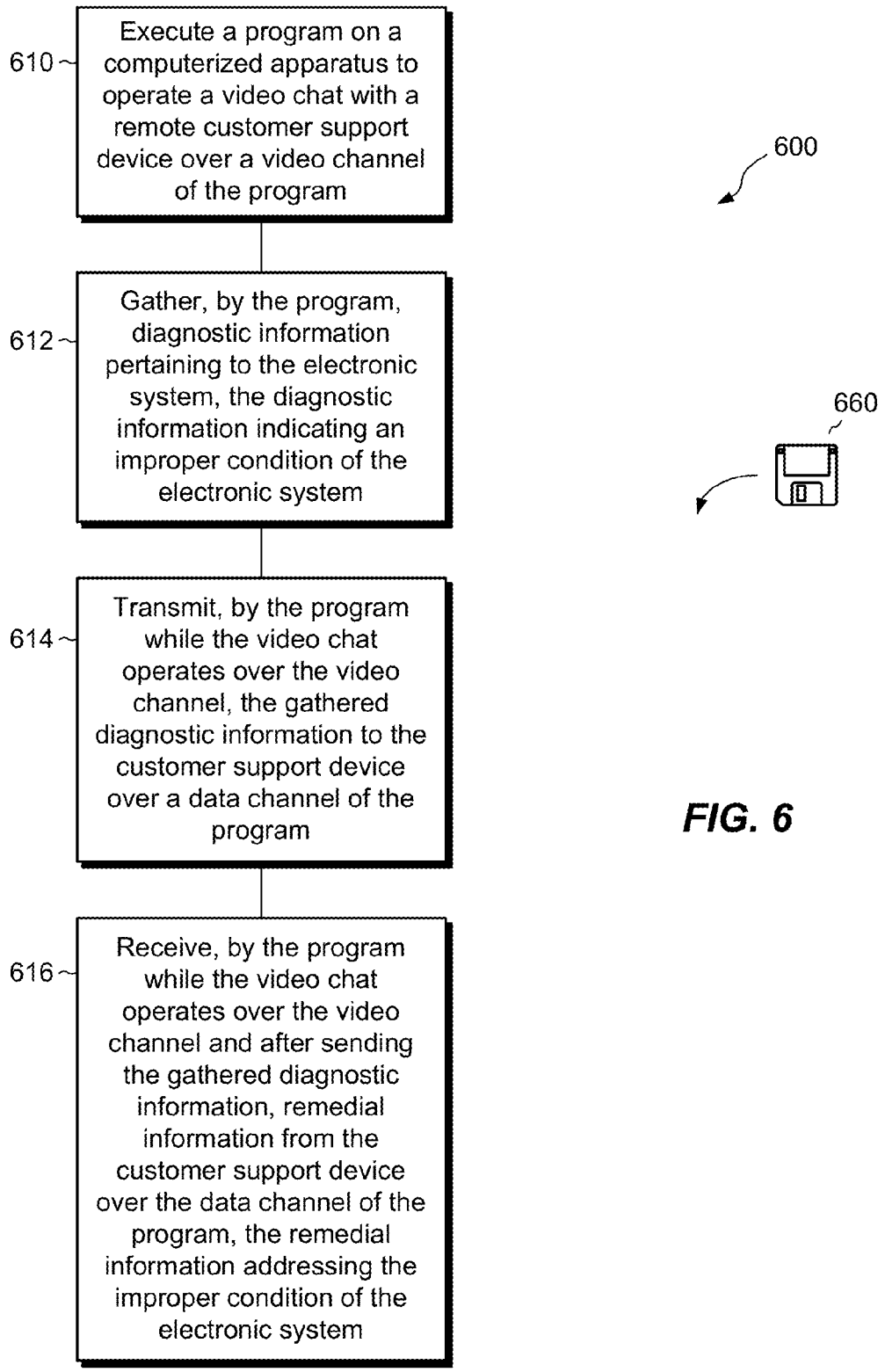
FIG. 6 is a flow chart showing an example process for obtaining customer support for an electronic system, such as that shown in FIG. 1, using a program that supports both a video channel and a data channel.
Figure 7:
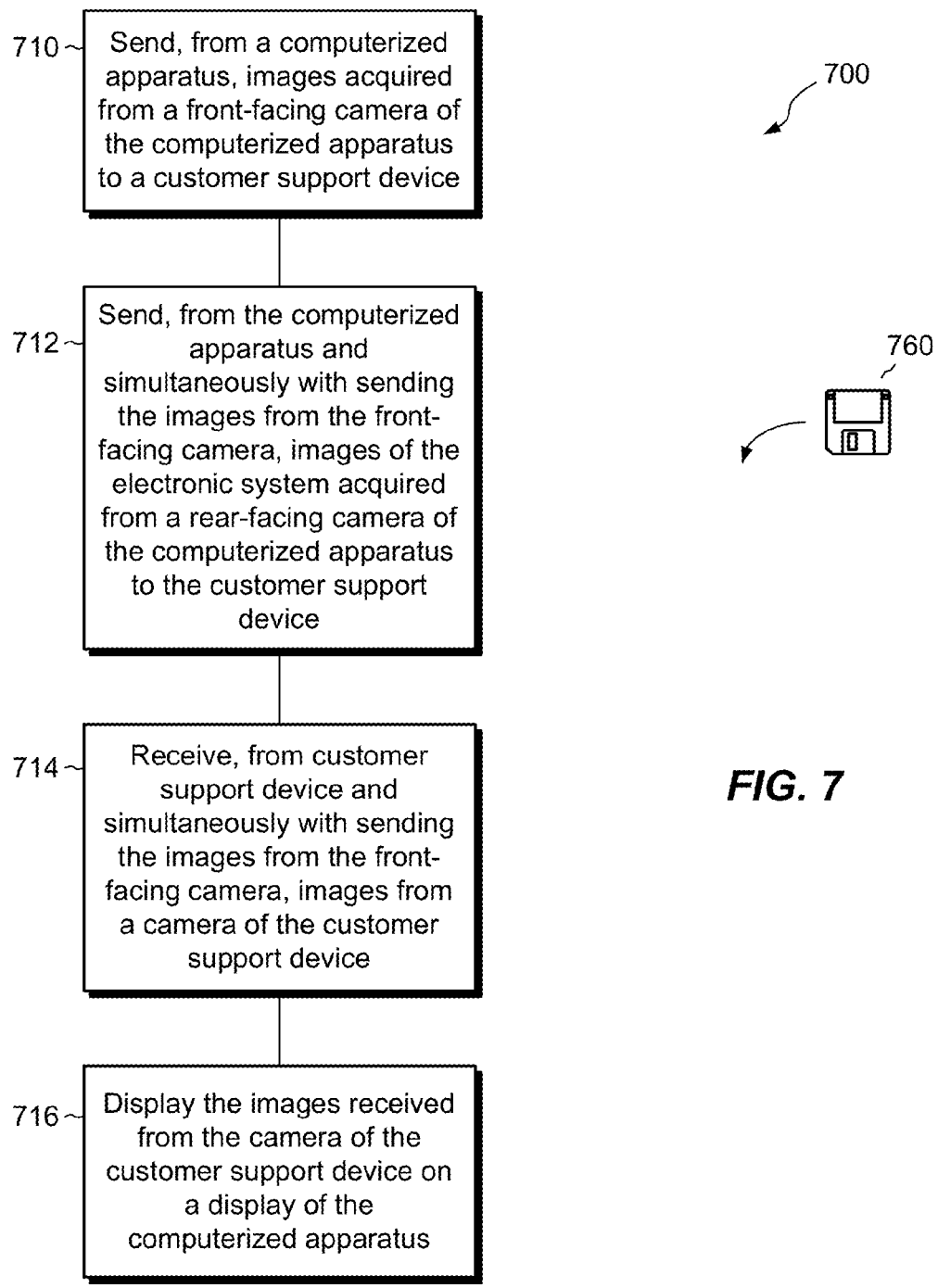
FIG. 7 is a flow chart showing an example process for obtaining customer support for an electronic system using both a front-facing camera and a rear-facing camera.

FIGS. 5-7 show processes that may be carried out in connection with the computerized apparatus 120. These processes are typically performed by the software constructs, described in connection with FIG. 2, which reside in the memory 230 of the computerized apparatus 120 and are run by the processor 220. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 5 shows three example processes that the chat program 240 may employ to identify a particular CITI for which a customer support session is to be conducted. In the examples of FIG. 5, the chat program 240 may be run independently of the management client 232, such that the chat program 240 uses some other means to identify a selected CITI besides selecting the CITI from the tree-based representation of FIGS. 3A and 3B. Three different processes are shown, which share a common step 550. The three processes may be used as alternatives or in any combination. In the examples described, the processes of FIG. 5 are carried out while a video chat with a customer support agent is taking place, i.e., after the chat program 240 has already initiated a chat session. In other examples, however, processes similar to those shown in FIG. 5 may be conducted prior to establishing a video chat with the customer support agent.

At step 510 and in accordance with a first process for identifying a CITI, the chat program 240 reads one or more RFID tags from a CITI, to obtain identifying information about the CITI. For example, the CITI may include an RFID tag that identifies the CITI, e.g., by customer, serial number, name, etc., and the chat program 240, operating through the interfaces 246, directs the RFID reader 280 to read the RFID tag.

At step 550, the chat program 240 transmits the identifying information to the customer support device 150. For example, the chat program 240 transmits the identifying information over the data channel 244 while the video chat with the customer support agent continues over the video channel 242 and images are sent from the rear-facing camera 128 without interruption.

In addition to obtaining identifying information about the CITI, the chat program 240 may also obtain, e.g., from other RFID tags, other information about the CITI, as well as information about various components of the CITI, such as circuit boards, chassis, assemblies, etc. The chat program 240 may transfer such information over the data channel 244 to the customer support device 150, to better inform the customer support agent about the configuration of the particular CITI.

At step 520 and in accordance with a second process for identifying a CITI, the chat program 240 reads one or more barcode labels from a CITI to obtain identifying information about the CITI. Here, the chat program 240 employs the rear-facing camera 128 to take a photograph, video image, or other image of a barcode label (or multiple barcode labels) provided on or in connection with the CITI. The rear-facing camera 128 acquires an image of the barcode label, and the chat program 240 processes the image to convert the barcode image to its corresponding text, where the text describes identifying information about the CITI. Control then proceeds as before to step 550, whereupon the chat program 240 transmits the identifying information to the customer support device 150. For example, the chat program 240 transmits the identifying information over the data channel 244 while the video chat with the customer support agent continues over the video channel 242 without interruption. It is understood that the chat program 240 may obtain images of any number of barcode labels on or in connection with the CITI, such as for various assemblies, subassemblies, components, etc., convert the barcodes to text, and transmit the text to the customer support device 150, where the text may assist the customer support agent in obtaining additional information about the CITI.

According to a variant on this second identification method, the chat program 140 simply continues to transmit video acquired from the rear-facing camera 128 as usual while the rear-facing camera 128 is pointed at a barcode label. Images of the barcode label are received by the customer support device 150, and the barcode images are converted to equivalent text on the customer support device 150.

At step 530 and in accordance with a third process for identifying a CITI, the chat program 240 computes a geographical location of the computerized apparatus 120. In one example, the GPS receiver 270 receives GPS signals and computes latitude and longitude of the current location. In another example, the computerized apparatus 120 uses network information, e.g., acquired from the Wi-Fi interface 250, cellular triangulation, e.g., acquired from the cell interface 252, and/or other techniques to obtain the current geographical location.

At step 540, a database is accessed to obtain identifying information about the CITI based on the computed geographical location. For example, the chat program 240 accesses the database, which stores information for cross-referencing geographical locations with CITI identification information. The chat program 240 queries the database to obtain the identification information for a CITI based on the computed geographical location. No direct interaction between the computerized apparatus 150 and the CITI is thus required. Rather, the mere co-location of the computerized apparatus 150 and the CITI are sufficient to identify the CITI for the purpose of conducting a customer support session. With the identifying information of the CITI thus obtained, control can proceed to step 550 as described above, whereupon the chat program 240 transmits the identifying information to the customer support device 150 over the data channel 244 while the video chat continues over the video channel 242 and images are sent from the rear-facing camera 128 without interruption.

In an alternative implementation, the customer support device 150, rather than the computerized apparatus 120, performs the step 540. For example, the chat program 140 running on the computerized apparatus 120 transmits the computed geographical location to the customer support device 150, and the customer support device accesses the database to obtain identifying information about the CITI based on the received geographical location. In various implementations, the database may be located on the computerized apparatus 120, on the customer support device 150, or at some location on a network accessible by the computerized apparatus 120 and/or the customer support device 150.

According to a further variant of this third CITI identifying process, the computerized apparatus 120 runs a mapping program, which may be provided as part of the chat program 240 or as a separate program that operates in coordination with the chat program 240. The mapping program causes the computerized apparatus 120 to display a map that shows the geographical location of the computerized apparatus 120 as well as the geographical location(s) of any CITIs in the vicinity of the computerized apparatus 120. For example, the mapping program accesses the database to obtain geographical locations of CITIs within the vicinity of the computerized apparatus 120 and renders icons on the map at the obtained locations. In some examples, the CITIs returned from the database may be limited to those of a particular customer or organization. The map displays CITIs in the form of icons. By selecting any such icons (e.g., by tapping, clicking, etc.), the chat program 140 sends geographical information and/or identifying information about the selected CITI to the customer support device 150. The computerized apparatus 120 and the customer support device 150 may then exchange diagnostic and/or remedial information about the identified CITI in the manner described above.

FIG. 6 shows an example process 600 for obtaining customer support for an electronic system using a program that supports both a video channel and a data channel.

At step 610, a program is executed on a computerized apparatus to operate a video chat with a remote customer support device over a video channel of the program. For example, the computerized apparatus 120 executes the chat program 140 to operate a video chat over the video channel 242. The chat program 140 may be initiated from a home screen of the computerized apparatus 120. Alternatively, the chat program may be initiated from the context-sensitive menu 340 (as shown in FIG. 3B) displayed by the management client 232, or from some other software construct. In an example, the chat program 240 conducts a face-to-face video chat between a user of the computerized apparatus 120 and a customer support agent operating the customer support device 150 while simultaneously transmitting video images acquired from the rear-facing camera 128 to the customer support device.

At step 612, the program gathers diagnostic information pertaining to the electronic system, where the diagnostic information indicates an improper condition of the electronic system. The improper condition may present itself as an error, a warning, or some other message or detectable event signaling an issue that may require attention. In one example, the chat program 140 displays a screen 400 on the touch screen 122 of the computerized apparatus 150, which includes a "Gather Diagnostics" button 414. In response to the user selecting the button 414, the chat program 140 communicates over the LAN 130 with the management server 110d3 of the CITI 110. The management server 110d3 queries the object model 110d2 to obtain the requested diagnostic information, which it returns to the chat program 140. In another example, the management client 232 communicates over the LAN 130 with the management server 110d3 of the CITI 110 to obtain the diagnostic information directly. The management server 110d3 queries the object model 110d2 to obtain the diagnostic information, which it returns to the management client 232.

At step 614, the program transmits the gathered diagnostic information to the customer support device over a data channel of the program while the video chat operates over the video channel. For example, the screen 400 includes a "Send to Support" button 416. In response to the user selecting the button 416, the chat program 140 sends the gathered diagnostic information to the customer support device 150 over the data channel 244, while the face-to-face video chat between the user and the customer support agent proceeds without interruption and while video images acquired from the rear-facing camera 128 are transmitted to the customer support device.

At step 616, the program receives remedial information from the customer support device over the data channel after sending the diagnostic information, while the video chat operates over the video channel. The remedial information addresses the improper condition of the electronic system. For example, the improper condition may represent an improper firmware revision of a component of the CITI and the remedial information addressing this condition includes a link to a proper firmware version. The chat program 140 receives the link (e.g., the link 410), over the data channel 244, while the video chat proceeds (e.g., in the window 412) without interruption and while video images acquired from the rear-facing camera 128 are transmitted to the customer support device.

FIG. 7 shows an example process 700 for obtaining customer support for an electronic system using both a front-facing camera and a rear-facing camera.

At step 710, images acquired from a front-facing camera of the computerized apparatus are sent from the computerized apparatus to a customer support device. For example, the computerized apparatus 120 executes the chat program 240 to operate a video chat over the video channel 242, and the front-facing camera 126 captures video of the user.

At step 712, images of the electronic system acquired from a rear-facing camera of the computerized apparatus are sent from the computerized apparatus to the customer support device, simultaneously with sending the images from the front-facing camera. For example, the chat program 240 operates the rear-facing camera 128 to acquire video of the CITI and sends the video over the video channel 242 simultaneously with sending video of the user obtained via the front-facing camera 126.

At step 714, images are received from a camera of the customer support device simultaneously with sending the images from the front-facing camera. For example, the chat program 240 receives video acquired from the camera 156 of the customer support device 150 over the video channel 242 simultaneously with sending the images acquired from the front-facing camera 126 over the video channel 242.

At step 716, images received from the camera of the customer support device are displayed on a display of the computerized apparatus. For example, the computerized apparatus 120 displays images received from the camera 156 over the video channel 242 on the touch screen 122.

An improved customer support technique has been described for an electronic system 110, such as a converged IT infrastructure (CITI). The improved technique includes engaging in a video chat with a remote customer support device 150 using a front-facing camera 126 of a computerized apparatus 120 while simultaneously acquiring images of the electronic system 110 using a rear-facing camera 128 and sending the images to the customer support device 150. A user of the computerized apparatus 120 can thus engage in a face-to-face video chat with a customer support agent operating the customer support device 150 while the customer support agent simultaneously sees both images of the user and images of the electronic system 110 or portion thereof to which the user is pointing the rear-facing camera 128. The improved technique thus provides a near-hands-on support experience from a remote customer support agent regardless of the customer support agent's physical location.

Having described certain embodiments, numerous alternative embodiments or variations can be made. For example, although the techniques disclosed herein involve the use of a front-facing camera and a rear-facing camera, alternatively, any two cameras that point in different directions can be used. For example, a laptop or other computerized apparatus may be provided with two webcams, one facing the user and another facing in the direction of the electronic system 110, which may be located above, below, to the left, or to the right of the computerized apparatus 120, as well as behind the computerized apparatus 120 or in some variable location relative to the computerized apparatus 120. The two cameras could then be used in substantially the same manner as described above.

Also, although it is described that images from both the front and rear-facing cameras 126 and 128 are provided in the form of video, this is merely an example. For instance, images acquired from the rear-facing camera 128 can be provided as a succession of still photographs or in some other format.

Also, it is understood that the chat program 240 can simultaneously send images to the customer support device 150 from both the front-facing camera 126 and the rear-facing camera 128 in a variety of ways. In one example, the chat program 240 sends full bandwidth video from both cameras simultaneously. In other examples, such as where network connections are poor and/or where hardware performance of the computerized apparatus 120 is limited, reduced bandwidth video may be sent. Where reduced bandwidth video is sent, the chat program 240 may give users the option to temporarily select one camera or the other for sending video at higher bandwidth, while video from the unselected camera is sent at lower bandwidth.

Also, although the management client 232 and chat program 240 are shown and described as separate programs, these programs may alternatively be combined to form a single program or provided in the form of some greater number of programs which perform the functions described.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 560, 660, and 760 in FIGS. 5-7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments. Those skilled in the art will therefore understand that various changes in form and detail may be made to the embodiments disclosed herein without departing from the scope of the invention.

What is claimed is:

1. A method of obtaining customer support for an electronic system, comprising:
   sending, from a computerized apparatus, images acquired from a first camera of the computerized apparatus to a customer support device; and
   sending, from the computerized apparatus and simultaneously with sending the images from the first camera, images of the electronic system acquired from a second camera of the computerized apparatus to the customer support device,
   wherein the first camera and the second camera point in different directions relative to the computerized apparatus.

2. The method of claim 1, further comprising:
   receiving, from customer support device and simultaneously with sending the images from the first camera, images from a camera of the customer support device; and
   displaying the images received from the camera of the customer support device on a display of the computerized apparatus.

3. The method of claim 2, wherein sending the images acquired from the first camera and receiving the images from the camera of the customer support device are performed as part of a video chat between a user of the computerized apparatus and a customer support agent operating the customer support device, and wherein the method further comprises acquiring images from the second camera of particular components of the electronic system.

4. The method of claim 3, further comprising acquiring an image from the second camera of a barcode label applied to a component of the electronic system.

5. The method of claim 4, further comprising converting the image of the barcode label acquired from the second camera to equivalent text, and sending the equivalent text to the customer support device separate from the images acquired from the first camera and the second camera.

6. A computerized apparatus, comprising:
   a processor; and
   memory, coupled to the processor, the memory storing executable instructions, which when executed by the processor cause the processor to perform a method of obtaining customer support for an electronic system, the method comprising:

sending, from a computerized apparatus, images acquired from a first camera of the computerized apparatus to a customer support device;

sending, from the computerized apparatus and simultaneously with sending the images from the first camera, images of the electronic system acquired from a second camera of the computerized apparatus to the customer support device, wherein the first camera and the second camera point in different directions relative to the computerized apparatus.

7. The computerized apparatus of claim 6, wherein the computerized apparatus comprises a mobile tablet computing device having a touch screen, wherein the touch screen and the first camera face forward, wherein the second camera faces backward, and wherein the method further comprises:

receiving, from the customer support device and simultaneously with sending the images from the first camera, images from a camera of the customer support device; and displaying the images received from the camera of the customer support device on a display of the computerized apparatus.

8. The computerized apparatus of claim 7, wherein the computerized apparatus further comprises a wireless network interface constructed and arranged to connect to the electronic system over a network.

9. The computerized apparatus of claim 8, further comprising an RFID (Radio Frequency Identification) reader constructed and arranged to read an RFID tag provided with the electronic system to obtain identifying information of a component of the electronic system.

10. The computerized apparatus of claim 8, further comprising geographical location circuitry constructed and arranged to compute a geographical location of the computerized apparatus.

11. A non-transitory computer readable medium including instructions which, when executed by a processor of a computerized apparatus, cause the processor to perform a method of obtaining customer support for an electronic system, the method comprising:

sending, from a computerized apparatus, images acquired from a first camera of the computerized apparatus to a customer support device;

sending, from the computerized apparatus and simultaneously with sending the images from the first camera, images of the electronic system acquired from a second camera of the computerized apparatus to the customer support device, wherein the first camera and the second camera point in different directions relative to the computerized apparatus.

12. The non-transitory computer readable medium of claim 11, wherein the method further comprises:

receiving, from the customer support device and simultaneously with sending the images from the first camera, images from a camera of the customer support device; and displaying the images received from the camera of the customer support device on a display of the computerized apparatus.

13. The non-transitory computer readable medium of claim 12, wherein the method further comprises acquiring images from the second camera of particular components of the electronic system.

14. The non-transitory computer readable medium of claim 13, wherein the method further comprises acquiring images from the second camera of barcode labels applied to components of the electronic system.

15. The non-transitory computer readable medium of claim 14, wherein the method further comprises converting the images of barcode labels acquired from the second camera to equivalent text and sending the equivalent text to the customer support device separate from the images acquired from the first camera and the second camera.

16. The non-transitory computer readable medium of claim 12, wherein the method further comprises:

executing a program on the computerized apparatus, the program supporting video communication over a video channel of the program and data communication over a data channel of the program;

gathering, by the program, diagnostic information from the electronic system, the diagnostic information indicating an improper condition of the electronic system;

transmitting, by the program while sending images of the electronic system acquired from a second camera over the video channel, the gathered diagnostic information to the customer support device over a data channel of the program; and receiving, by the program while sending images of the electronic system acquired from the second camera over the video channel and after transmitting the gathered diagnostic information, remedial information from the customer support device over the data channel of the program, the remedial information addressing the improper condition of the electronic system, wherein sending images acquired from the first camera, sending images of the electronic system acquired from the second camera, and receiving images from the camera of the customer support device are performed over the video channel under direction of the program.

17. The non-transitory computer readable medium of claim 16, wherein the diagnostic information transmitted to the customer support device indicates an improper firmware component of the electronic system, wherein the remedial information received from the customer support device identifies another firmware component to replace the improper firmware component, and wherein the method further comprises installing the other firmware component on the electronic system.

18. The non-transitory computer readable medium of claim 16, wherein the diagnostic information transmitted to the customer support device further indicates an improper software component of the electronic system, wherein the remedial information received from the customer support device further identifies another software component to replace the improper software component, and wherein the method further comprises installing the other software component on the electronic system.

19. The non-transitory computer readable medium of claim 11, wherein the method further comprises executing a program on the computerized apparatus, the program supporting video communication over a video channel of the program and data communication over a data channel of the program, wherein sending images acquired from the first camera, sending images of the electronic system acquired from the second camera, and receiving images from the camera of the customer support device are performed over the video channel under direction of the program.

20. The non-transitory computer readable medium of claim 11, wherein sending the images acquired from the first camera and receiving the images from the camera of the customer support device are performed as part of a video chat between a user of the computerized apparatus and a customer support agent operating the customer support device, and wherein the method further comprises acquiring images from the second camera of particular components of the electronic system.

* * * * *